United States Patent [19]
St. Andre et al.

[11] 3,821,835
[45] July 2, 1974

[54] MACHINE TOOL

[75] Inventors: Arthur Francis St. Andre, Marlboro; David Hamilton Youden, Shrewsbury, both of Mass.

[73] Assignee: Cincinnati Milacron-Heald Corp., Worcester, Mass.

[22] Filed: Aug. 17, 1972

[21] Appl. No.: 281,526

[52] U.S. Cl............... 29/36, 82/2.5, 82/2.7, 408/35, 408/71
[51] Int. Cl............................................ B23b 15/00
[58] Field of Search............ 29/35.5, 44, 36; 82/2.5, 82/36 A, 2.7; 408/35, 71, 234

[56] References Cited
UNITED STATES PATENTS
3,187,609  6/1965  Stephan ..................... 409/234 X
3,459,076  8/1969  Kummer ........................ 29/44 X
3,691,879  8/1972  Blake ............................ 82/2.5 A FOREIGN PATENTS OR APPLICATIONS
1,148,840  5/1963  Germany ........................... 82/2.7

Primary Examiner—Andrew R. Juhasz
Assistant Examiner—Z. R. Bilinsky
Attorney, Agent, or Firm—Norman S. Blodgett; Gerry A. Blodgett

[57] ABSTRACT

A machine tool having a turret which carries both a tool and a workpiece grasping device; the movement of the turret allows the grasping device to take a workpiece from a storage location and place it in the workhead for the performance of a machining operation by the tool.

10 Claims, 6 Drawing Figures

MACHINE TOOL

BACKGROUND OF THE INVENTION

In the automation of machine tools, the design philosophy has been generally to duplicate the actions that a human operator would perform. Because automatic tool movement is a relatively old art, designers of workpiece-handling equipment have tended to create a separate piece of equipment to handle the movement of the workpiece in and out of the work area. The need for two separate transport systems each with its own set of control equipment, not only has added to the high cost of automation, but contributed greatly to the chance of component failure. Furthermore, the interaction between the two systems required careful synchronization and allowed minor component failures to cause major damage. These and other difficulties experienced with the prior art devices have been obviated in a novel manner by the present invention.

It is, therefore, an outstanding object of the invention to provide a machine tool in which the workpiece handling, and tool exchange and movement function, are both carried out with the same transport system.

Another object of this invention is the provision of a machine tool which is simple, inexpensive, and easy to maintain.

A further object of the present invention is the provision of a machine tool in which unnecessary component duplication has been eliminated.

It is another object of the instant invention to provide a machine tool in which the tool handling and workpiece handling equipment cannot interfere with each other.

A still further object of the invention is the provision of a machine tool in which a simple mechanism allows transfer of a workpiece from one machine tool to a similar one.

With these and other objects in view, as will be apparent to those skilled in the art, the invention resides in the combination of parts set forth in the specification and covered by the claims appended hereto.

SUMMARY OF THE INVENTION

This invention involves a machine tool in which the workpiece handling function and the tool handling function are carried out by the same transport equipment. A multiple station turret is movable to act on a workpiece with various tools. The turret is also capable of moving to transfer a workpiece, from storage, to the workhead and returning it to storage.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
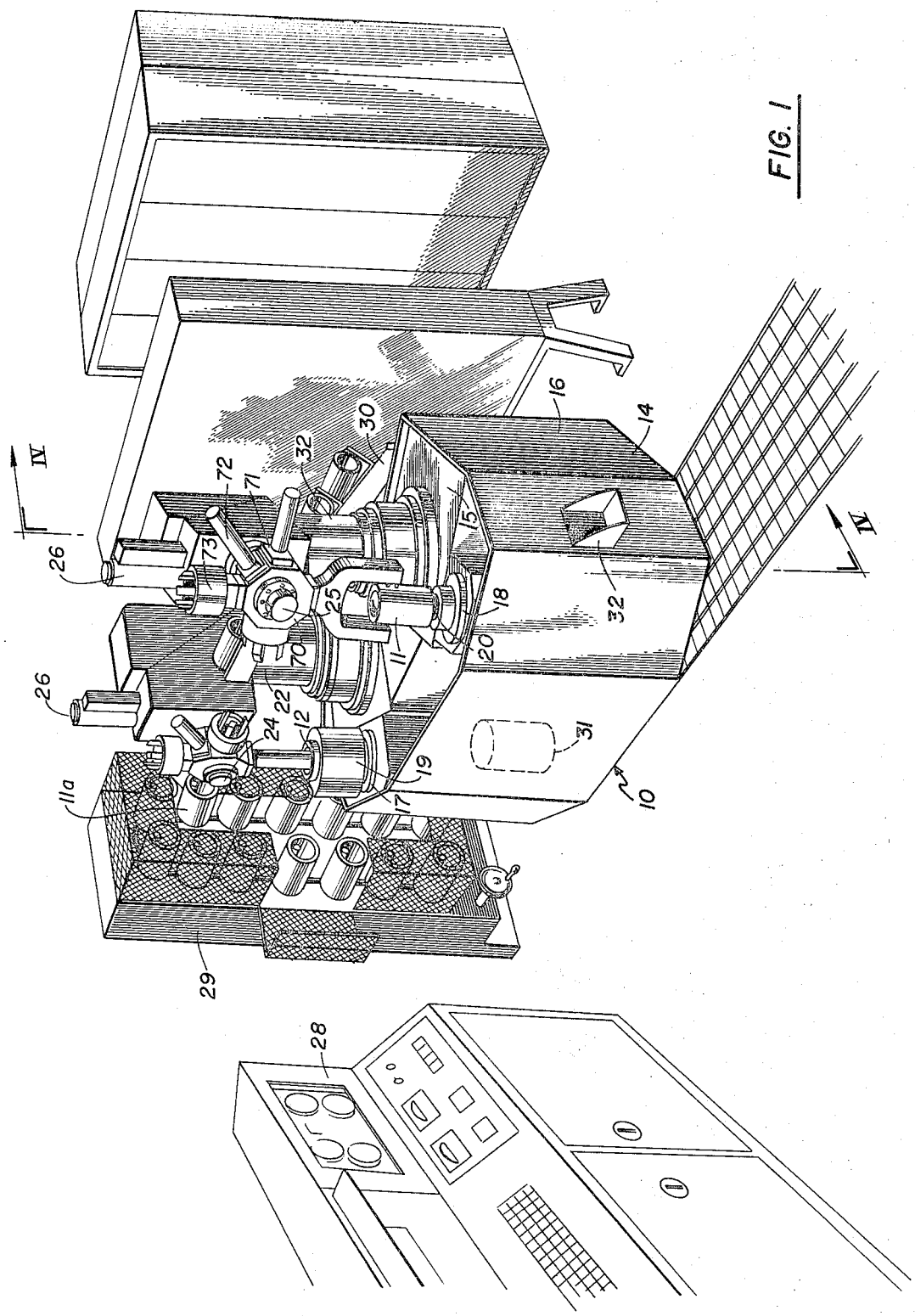
FIG. 1 is a perspective view of a machine tool embodying the principles of the present invention.

Referring first to FIG. 1, which best shows the general features of the invention, the machine tool, indicated generally by the reference numeral 10, is shown being used to finish surfaces of revolution on workpieces 11 and 12. The machine tool is provided with a base 14 adapted to rest on the floor and having a generally horizontal deck or upper surface 15, which is enclosed in a vertical wall 16. Extending upwardly from the upper surface 15 are two workheads 17 and 18, carrying chucks 19 and 20, respectively, for rotation about vertical axes. The chuck 19 grasps the outside surface of the workpiece 12, while the chuck 20 grasps the inside surface of the workpiece 11 for rotation about the axis of the surface of revolution which is to be finished.

Extending upwardly from the deck or upper surface 15 are turret supports 22 and 23 in the form of large cylindrical columns. Attached to the upper ends of the columns 22 and 23, respectively, are turrets 24 and 25 each of which is rotatable about a horizontal axis passing through the axis of its respective column. Rotation of each turret is controlled by a rack and pinion driven by a cylinder 26. The turrets have on their periphery 70 a number of holding stations 71, each of which is capable of holding either a tool 72 or a workpiece grasping device 73. Each workpiece grasping device 73, consists of a frame 74, and fingers 75, which are operable to grasp a workpiece by either the outside or inside surface.

Figure 4:
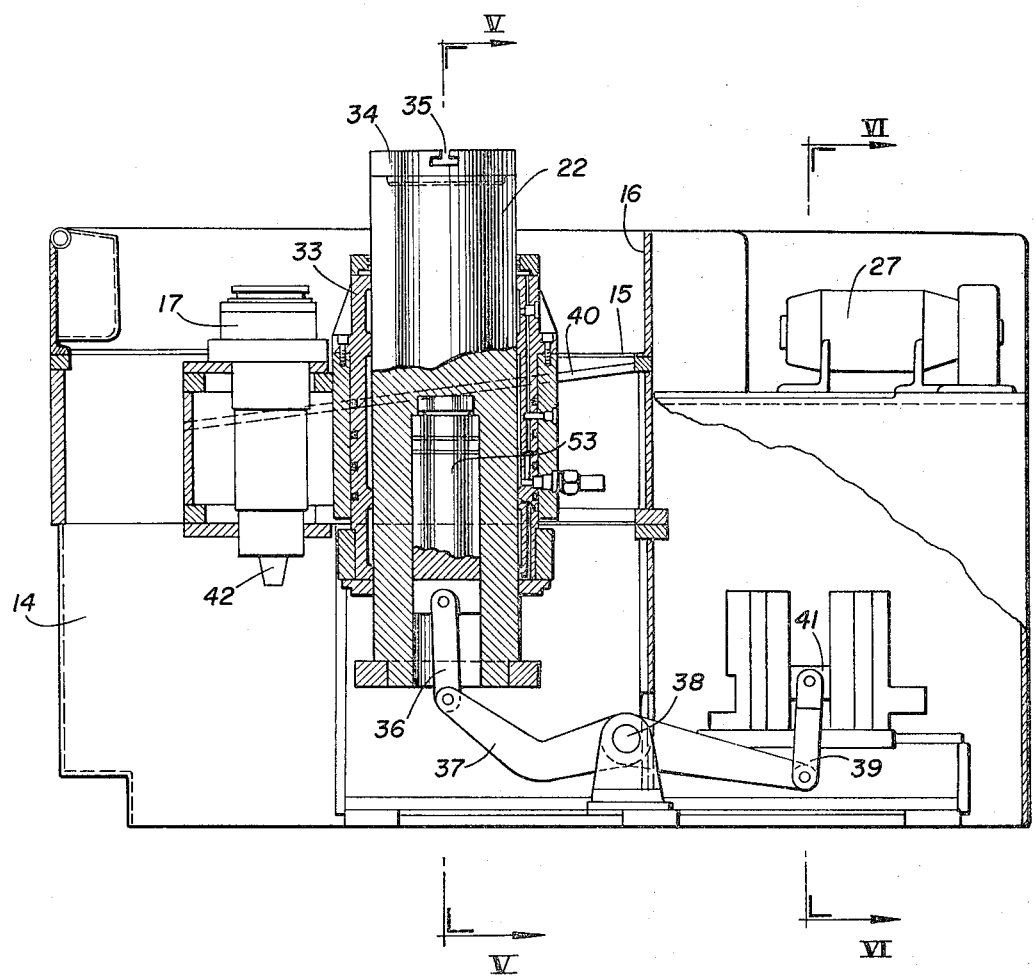
FIG. 4 is a vertical sectional view of the apparatus taken on the line IV—IV in FIG. 1.

Mounted on the machine on the general level of the upper surface 15 but exteriorly of the wall 16 is an electric motor 27 (See FIG. 4). An electrical control cabinet 28 of the tape-operated type is located adjacent the machine tool. A workpiece storage rack 29 is located beside the machine tool and includes an automatic feeding means to bring the workpieces sequentially to a loading position. This position is the one occupied by the workpiece 11a in FIG. 1. A hydraulic unit is mounted to one side of the machine and carries the usual pumps and reservoirs associated with the hydraulic supply of a machine tool. Mounted on the inside of the base is a motor 31 which is mounted with its axis vertical for driving the spindles associated with the workheads 17 and 18. Extending from the side of the machine is a chute 32 which, as will be shown hereinafter, discharges coolant and chips resulting from the machining operations taking place above the upper surface 15.

Referring to FIG. 4, it can be seen the turret support 22 is mounted in a fixed hydrostatic bearing sleeve 33 which holds the cylindrical column firmly against angular movement about a horizontal axis but which permits vertical movement along the axis of the cylinder and rotative movement about that same axis. The upper end of the tool support is provided with a cap 34 having a Tee slot 35 which is used for the attachment of the upper column section which carries the turret 24. The bottom end of the turret support is connected through a link 36 to one end of a generally horizontal lever 37 mounted in its central portion in a journal 38 having a horizontal axis, the other end of the lever being attached through a link 39 to a slide 41.

This figure shows clearly the manner in which the workhead 17 is mounted vertically in the base 14, extends well above the upper deck or surface 15. The workhead is clearly provided with a vertical spindle 42 which is connected by vee belts (not shown) to the output shaft of the spindle motor 31, those same belts operating a similar spindle on the workhead 18. This view shows particularly well the manner in which the upper deck 15 is provided with an inclined surface 43 which slants downwardly to join the chute 32 for the accumulation and removal of chips and cooling fluid.

Figure 5:
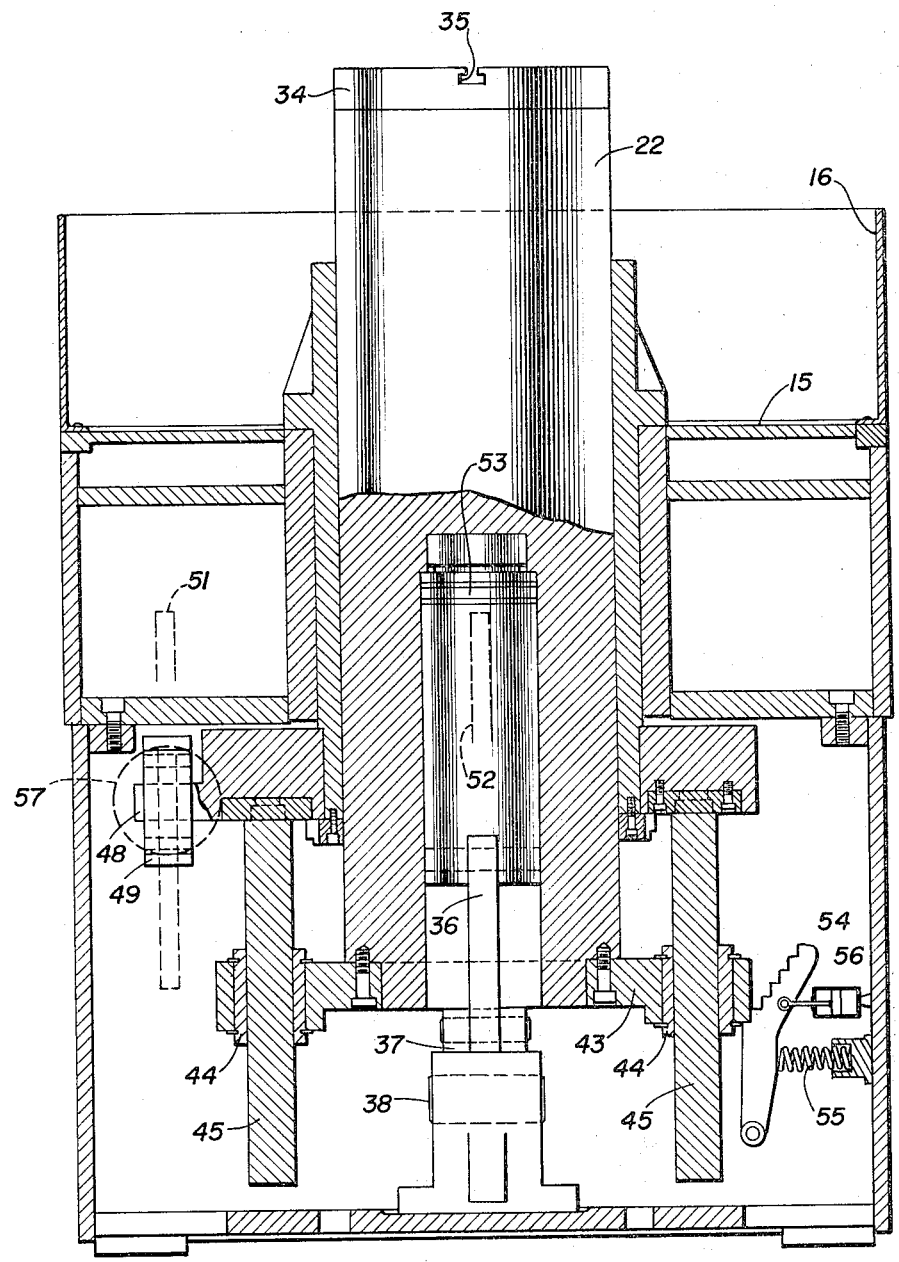
FIG. 5 is a vertical sectional view of the apparatus taken on the line V—V in FIG. 4.

FIG. 5 shows the manner in which the turret support 22 is supported for vertical movement and for rotation about the axis of the cylinder. At the lower end, it is provided with a spider 43 having bushings 44 which slide freely over dependent vertical posts 45. These posts are suspended from a ring 46 which is mounted for rotation on the outside of the fixed bushing 33 in which the column is vertically slidable. The spider 43 rests on a ring 47 which is bolted to the bottom of the bushing 33 and extends outwardly therefrom in the manner of a flange or shoulder.

The ring 46 is provided with an outwardly extending finger 48 on which is mounted a connector 49 which, in turn, is actuated for the rotation of the ring 46 by means of a cam 51 shown in dotted form in the background. This figure also shows in dotted form the cam 52 which operates through the lever 37 to produce vertical movement of the turret support 22. It should be noted that the link 36 is connected to the lower end of a piston 53 slidable in a suitable vertical bore at the bottom end of the turret support 22. This provides for extended travel of the column upwardly beyond what would normally be given it by the cam 52.

Operative on the spider 43 is a step latch 54 which is pivotally mounted on the base normally pressed toward the spider 43 by a coil spring 55. It can be drawn away from the spider by a pneumatic cylinder 56. Fastened on the forward end of the connector 49 is an air cylinder 57 which normally pushes the connector 49 (or cam follower) toward the cam 51 to keep it in constant contact therewith. It is this piston under continuous air pressure which returns the turret support 22 back to its original position of rotation after a work cycle has been completed. The same cylinder may be used on occasion for extended travel of the column from it normal extreme position of rotation as would be brought about by the highest point on the cam 51.

Figure 6:
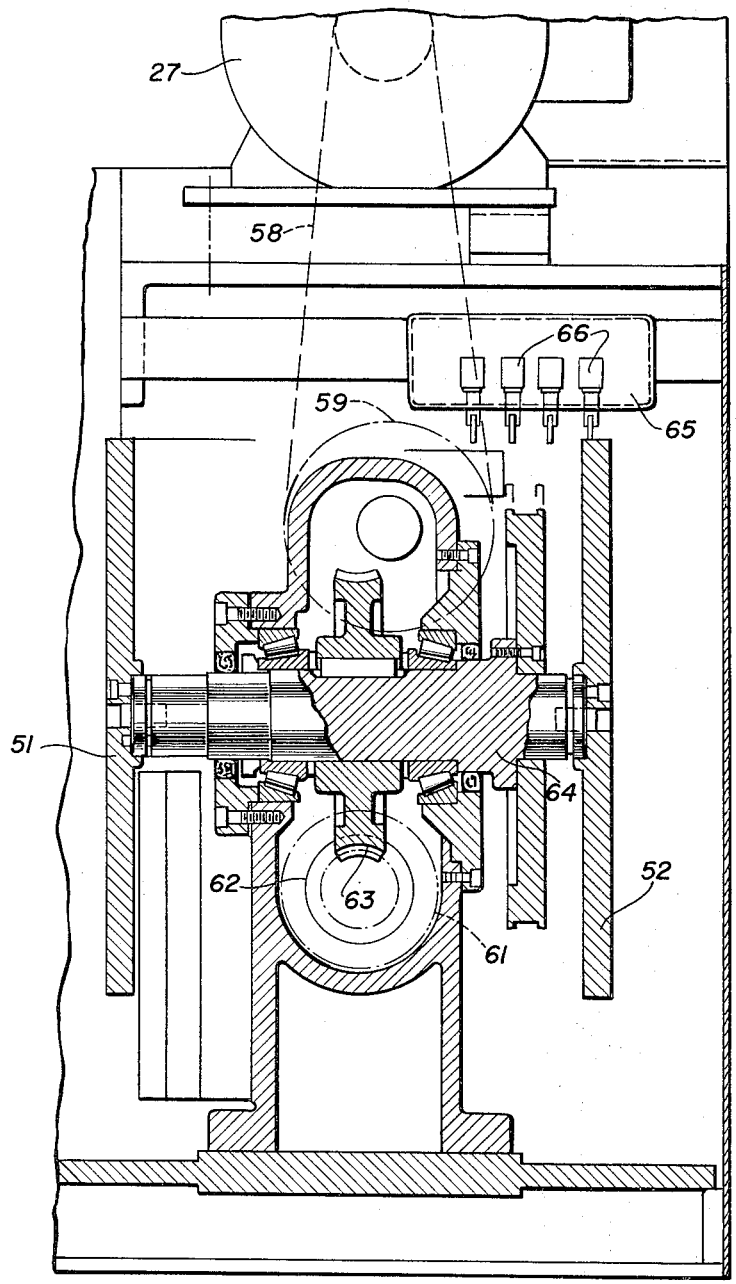
FIG. 6 is a vertical sectional view of the apparatus taken on the line VI—VI in FIG. 4.

Referring now to FIG. 6, it can be seen that the cam motor 27 operates through a belt 58 to operate a pulley 59 which, in turn, is connected to a pulley 61 which is keyed to a horizontal worm 62. This worm engages and rotates a worm gear 63 which is keyed to a horizontal camshaft 64 carrying at opposite ends the cams 51 and 52. A control box 65 carries a series of limit switches 66 which engage various parts of the cams and their operative mechanism to stop cam motion during portions of the cycle and to limit the motions of the cams from time to time.

Figure 3:
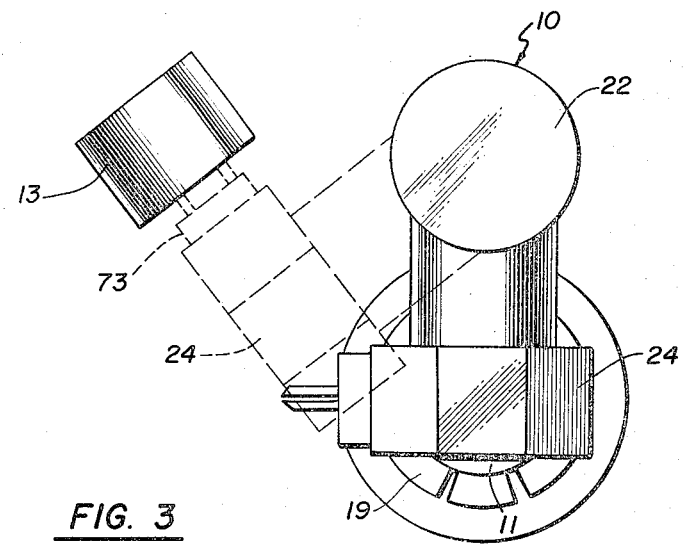
FIG. 3 is a plan view of the portion of the machine tool.
Figure 2:
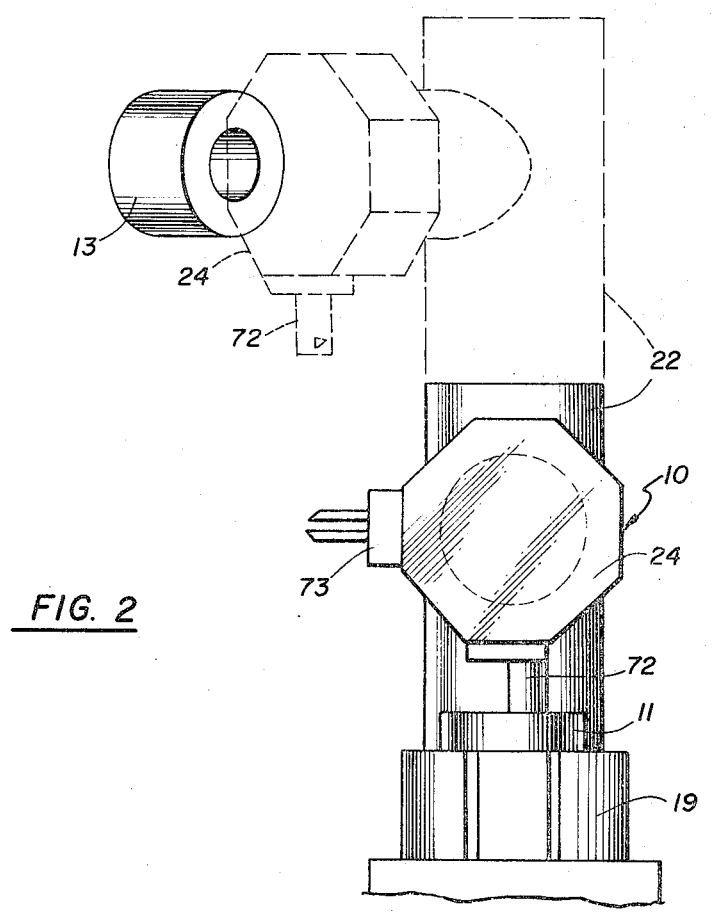
FIG. 2 is a front elevation view of a portion of the machine tool.

The operation of the apparatus will now be readily understood in view of the above discussion. FIGS. 2 and 3 show a simplified diagram in front and top view, of a turret arrangement involving the present invention. The solid line views, show the turret 24 as if it were using tool 72 to bore workpiece 11 held in chuck 19. The dashed line view shows the turret 24 as it is upwardly extended and the column 22 is rotated to allow grasping device 73 to grab workpiece 13, which is shown in the storage rack 29.

In actual operation, the column rotates, moving from the position shown by the dashed lines, where the stored workpiece 13 is engaged by the grasping device. This action brings the turret over the work area. The turret is turned, directing the workpiece toward the chuck 19. The turret and column then descend, placing the workpiece 13 in the chuck 19.

The grasping device then releases the workpiece and ascends, leaving the workpiece to be held by the chuck 19. In its upward position, the turret again rotates, directing the tool 72 toward the workpiece. The turret descends, and the tool acts upon the workpiece. By operating in reverse, the workpiece can be returned to storage, directed to a similar machine tool for further processing, or placed in a discharge chute. Addition of tools and grasping devices to the turret, allows multiple operations and several workpieces to be handled by the machine at the same time.

Methods for causing and controlling the various motions of this invention are many and would be obvious to one skilled in the art of automated machine tools.

In the preferred embodiment, rotation of the turret would be carried out using a cylinder 26 which would act on a rack through a worm gear. The rack would, in turn, act on a spur gear to rotate a shaft on which the turret is held. A curvic coupling is used to render the turret not only in a rotatable rigid state, but also to set its angular position accurately.

Once the workpieces have been locked in the chucks 19 and 20, the motor 27 is energized and it operates through the worm 62 and the worm gear 63 to move the cams 51 and 52. The cam 51 operates through the cam follower or connector 49 to rotate the ring 46 and, therefore, to rotate the turret support 22. This brings the tools 72 into a preset position relative to the axes of the surface of revolution of the workpiece which is to be finished. In the generation of a cylinder, for instance, it would be the usual practice to rotate the turret support 22 to an angle where the distance from the axis of the workhead and of the workpiece to the point of the tool is equal to the desired radius of the cylinder. Then, the angularity of the column is locked in that position and the column is moved vertically only to introduce the tool to the workpiece and to generate the cylindrical surface. After the machining operation is over, it is a simple matter to swing the column in the opposite direction to move the tool away from the workpiece and then to swing the turret and tool even further angularly to remove it from a position overlying the workhead. When it is necessary to raise the column, the cylinder 53 can be energized to produce an even longer longitudinal rise of the column out of the base 14 and then produce an extraordinary angular motion by use of the cylinder 57 the column is raised to a very high vertical position and is rotated toward the outside of the machine tool. The usual hydraulic fluid is supplied under pressure to the hydrostatic pockets formed on the inside of the bushing 33 so that the cylindrical work support 22 is mounted in a long hydrostatic bearing which gives it extraordinary stiffness lending extreme accuracy to the machining operations despite machine forces which would tend to bend the column. The column is extraordinarily large in diameter to prevent such bending and the bearing in which it is carried is in the manner described made very stiff so that these forces do not make themselves felt as a deflection of the tool away from the desired surface of revolution to be machined. At the same time, in the manufacture of the machine, it can be seen that there is no need for the straight ways that are conventionally used in such machine tools. Actually, if is a very simple procedure to generate a very accurate cylinder for the turret support 22 and to provide the internal cylindrical surfaces in the bushing 33 to a very accurate degree so that the guiding is accomplished to a high degree of accuracy at relatively low-manufacturing cost. The same benefit appears again when one is concerned with the maintenance of the machine tool. There are no straight ways to be bent, knocked, scratched, or otherwise placed in a condition where they fail to guide the tool holder in a straight geometric line. At the same time, it is a very simple matter to change the nature of the machining cycle by replacing the cams 51 and 52 with cams which are formed to take care of the new cycle. The wall 16 forms a protective shield around the work area and causes cooling fluid and chips to fall down into the trough 40 and out through the chute 32.

It is obvious that minor changes may be made in the form and construction of the invention without departing from the material spirit thereof. It is not, however, desired to confine the invention to the exact form herein shown and described, but it is desired to include all such as properly come within the scope claimed.

We claim:

1. A machine tool for generating a surface on a workpiece, comprising:
    a. a base,
    b. a first turret mounted on the base, said turret having a periphery and being rotatable about a first axis,
    c. a plurality of stations located on the periphery,
    d. a tool for generating a surface on a workpiece, said tool being carried by one of the stations on the turret, and
    e. a grasping means carried by one of the stations on the turret, and capable of grasping the workpiece, wherein a column is provided, which is slidably mounted on the base, and the turret is rotatably mounted on the column with its axis extending through and at a right angle to the axis of the column, and wherein the column has a longitudinal axis, and is capable of movement along and rotation about its axis, and means is provided to control column movement.

2. A machine tool as recited in claim 1, wherein the longitudinal axis is vertical, and the first axis is horizontal.

3. A machine tool as recited in claim 1, wherein the tool and grasping means are independent and located in different stations.

4. A machine tool as recited in claim 1, wherein the column is mounted on the base through hydrostatic bearings.

5. A machine tool for generating a surface on a workpiece, comprising:
    a. a base,
    b. a first turret mounted on the base, said turret having a periphery and being rotatable about a first axis,
    c. a plurality of stations located on the periphery,
    d. a tool for generating a surface on a workpiece, said tool being carried by one of the stations on the turret, and
    e. a grasping means carried by one of the stations on the turret, and capable of grasping the workpiece, wherein a second turret is provided, having a periphery, stations on the periphery and a tool and a grasping means, the tool and grasping means being mounted on the stations, and the movement of the first and second turrets being such, that transfer of a workpiece between them is possible.

6. A machine tool as recited in claim 5, wherein the first turret can place a workpiece in an intermediate location where it is available to the grasping means of both turrets.

7. A machine tool, comprising
    a. a base,
    b. a workpiece storage magazine located adjacent the base,
    c. a column mounted on the base for rotation about and sliding in the direction of a longitudinal axis,
    d. a turret head mounted on the column for movement therewith and for additional movement about a rotational axis passing through the said longitudinal axis of the column at a right angle thereto,
    e. a workhead mounted on the base adjacent the column,
    f. a workpiece clamp extending from the turret and movable with the turret and column to carry a workpiece from the magazine to the workhead, and
    g. a tool extending from the turret at a position angularly spaced from the workpiece clamp.

8. A machine tool as recited in claim 7, wherein the workpiece storage magazine includes a means for bringing the workpiece sequentially to a loading position.

9. A machine tool as recited in claim 8, wherein the said longitudinal axis of the column is vertical, the rotational axis of the turret is horizontal, a workpiece in the said loading position is horizontal, and the workpiece clamp extends in a generally-horizontal direction when it engages the workpiece in the said loading position.

10. A machine tool as recited in claim 9, wherein the workhead is rotatable about a vertical axis and the workpiece clamp extends in a generally-vertical downward direction when it delivers a workpiece to the workhead.

* * * * *